(12) United States Patent
Nagata

(10) Patent No.: US 7,231,101 B2
(45) Date of Patent: Jun. 12, 2007

(54) ELECTRO-OPTIC WAVEGUIDE DEVICE CAPABLE OF SUPPRESSING BIAS POINT DC DRIFT AND THERMAL BIAS POINT SHIFT

(75) Inventor: Hirotoshi Nagata, Avon, CT (US)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 11/131,634

(22) Filed: May 18, 2005

(65) Prior Publication Data

US 2006/0233494 A1  Oct. 19, 2006

Related U.S. Application Data

(60) Provisional application No. 60/672,343, filed on Apr. 18, 2005.

(51) Int. Cl.
*G02F 1/035* (2006.01)
*G02B 6/10* (2006.01)
*G02B 6/26* (2006.01)

(52) U.S. Cl. .............................. 385/2; 385/40; 385/131
(58) Field of Classification Search .................... 385/2, 385/8, 14, 40, 129–132
See application file for complete search history.

(56) References Cited

U.S. PATENT DOCUMENTS

| | | | |
|---|---|---|---|
| 5,404,412 A | 4/1995 | Seino et al. | 385/2 |
| 5,473,711 A | 12/1995 | Hakogi et al. | 385/14 |
| 5,526,448 A | 6/1996 | Nagata et al. | 385/1 |
| 5,598,490 A * | 1/1997 | Hakogi et al. | 385/14 |
| 5,949,944 A | 9/1999 | Minford et al. | 385/131 |
| 6,654,512 B2 | 11/2003 | Burns et al. | 385/2 |
| 6,661,934 B2 | 12/2003 | Burns et al. | 385/2 |

OTHER PUBLICATIONS

Gee et al., "Minimizing dc drift in LiNbO$_3$ waveguide devices," Appl. Phys. Lett., vol. 47 (3), Aug. 1, 1985, pp. 211-213.
Nagata et al., "Dc-voltage-induced thermal shift of bias point in LiNbO$_3$ optical modulators," IEEE Photonic Technol. Lett., vol. 16, issue 11, Nov. 2004, pp. 2460-2462.
Wooten et al., "A review of lithium niobate modulators for fiber-optic communications systems," IEEE J. Selected Topics Quantum Electron., vol. 6, pp. 69-82, Jan./Feb. 2000.
CRC Handbook of Chemistry and Physics 79th Edition, 1998-1999, p. 9-51 to 9-56.

* cited by examiner

*Primary Examiner*—Quyen Leung
(74) *Attorney, Agent, or Firm*—Allen, Dyer, Doppelt, Milbrath & Gilchrist, P.A.

(57) ABSTRACT

The present invention discloses an electro-optic waveguide device such as a modulator. The device has an electro-optic substrate having optical waveguides within the substrate at or near an upper surface. A buffer layer is formed on the top surface of the electro-optic substrate. A novel block layer is formed on the buffer layer surface, which can suppress or lessen an unwanted occurrence of chemical reactions at or near the surface of the buffer layer. A charge bleed off layer is formed on the block layer, which has a certain amount of electrical conductivity to bleed off any electrical charges generated on or in the electro-optic waveguide device. Electrodes are on the charge bleed off layer, which can provide electrical signals to the optical waveguides through the buffer layer, the block layer, and the charge bleed off layer.

17 Claims, 15 Drawing Sheets

US 7,231,101 B2

ELECTRO-OPTIC WAVEGUIDE DEVICE CAPABLE OF SUPPRESSING BIAS POINT DC DRIFT AND THERMAL BIAS POINT SHIFT

CROSS-REFERENCE TO RELATED APPLICATIONS

The present invention claims priority from U.S. Provisional Patent Application No. 60/672,343 filed Apr. 18, 2005, entitled "Electro-Optic Waveguide Device Structure to Suppress Bias Point DC Drift and Thermal Bias Point Shift and its Fabrication Method", which is incorporated herein by reference for all purposes.

FIELD OF THE INVENTION

The invention relates to lithium niobate devices. More particularly, the invention relates to increasing the chemical stability of a buffer bleed layer interface in a lithium niobate waveguide device; further, the invention provides means for lessening a generation of dc-voltage-induced defects at the interface; and provides an improvement in both dc drift and dc voltage induced growth behavior of bias point thermal shift.

DESCRIPTION OF THE RELATED ART

Electrooptic devices employing materials such as lithium niobate (LN) are often used as modulators, for example within fiber optic communication systems, for signal processing applications, and as sensors. These modulators include optical intensity modulators, switches, phase or frequency shifters, polarization transformers and wavelength filters.

Referring now to FIG. 1, by way of example, a conventional z-cut LiNbO$_3$ (LN) optical modulator is shown, comprising a LN substrate 1 with one or more optical waveguides 2a, 2b within the LN substrate at or near an upper surface 3 thereof. A dielectric buffer layer 4 covers the upper surface of LN substrate; and, a charge bleed-off layer 5 is formed on the dielectric buffer layer 4. Electrodes 6a, 6b are formed over the top surface.

In operation, the dielectric buffer layer serves to suppress absorption of a propagating optical signal caused by the conductive over layers such as the charge bleed off layer and the electrodes; and, serves to match the speed of the RF signal propagating in the electrode to a speed of the optical signal propagating in the waveguide.

The charge bleed-off layer serves to suppress an undesirable interaction of surface charges caused by a pyroelectric property of the LN substrate; and, serves to stabilize the modulator operated under variable temperature. The charge bleed-off layer is sometimes called a "semiconductive layer", as it is referred to in U.S. Pat. No. 5,473,711 or it is sometimes called a "surface charge dissipation layer" as it is referred to in U.S. Pat. No. 5,949,944, incorporated herein by reference. This charge bleed-off layer is made of an electrical conductive film such as Si, silicon titanium nitride, silicon titanium oxynitride, or other suitable conductive materials.

U.S. Pat. Nos. 5,473,711, and 5,598,490, both incorporated herein by reference, disclose a structure having a diffusion suppressing layer 24 between the semiconductor film 20 (or charge dissipation layer 20, or bleed layer 20,) and electrodes 22a, 22b. This is shown in FIG. 2. The purpose of the diffusion suppressing layer 24 is to prevent a diffusion of Au ions from the electrodes 22a, 22b, into the Si semiconductive layer. Furthermore, Au-contaminated Si has a significantly low electrical conductivity and may cause failures such as short-circuit between electrodes 22a and 22b.

Referring now to FIG. 3, and U.S. Pat. No. 5,949,944, a surface charge dissipation layer 33 is shown in the form of a layer of silicon titanium nitride with a nominal formula of $Si_2Ti_xN_{8/3-x}$ applied to the buffer layer 32. This charge dissipation layer 33 dissipates bleed off charges that would accumulate on the dielectric surface and has an electric receptivity of 15 KΩcm to about 150 KΩcm.

The use of a similar film of silicon titanium nitride on the backside of the substrate is also disclosed.

Since the actual film preparation process for a nitride film such as $SiTi_xN_{8/3-x}$ disclosed in U.S. Pat. No. 5,949,944, inevitably introduces oxygen as an uncontrollable contamination and makes it difficult to accurately control the film conductivity, U.S. Pat. Nos. 6,661,934, and 6,654,512 incorporated herein by reference disclose a procedure to intentionally add oxygen into the film and deposit a silicon titanium oxynitride film. As shown in FIG. 4, a structure having multi-layers and a wrap-around layer 43c connecting electrodes 43a, 43b is also disclosed as a design to improve temporal and thermal stability of the device. Hot electrode 43d is isolated from 43a, 43b, and 43c. The device of FIG. 4 has an undoped buffer layer 42 over the LN substrate; upon layer 42 is a layer of silicon titanium oxynitride 44 having deposited thereon a layer of silicon titanium oxynitride 46.

In reference to FIGS. 1 through 4, from a long-term reliability point of view, the dielectric buffer layer is also designed to have a certain electrical conductivity in stead of being a complete insulator, as is disclosed in U.S. Pat. No. 5,404,412. The LN modulators are generally operated by applying dc bias voltages to the electrode(s) in such a manner as to maintain the optical output transfer curve at a same state over varied temperature and operation time. However, due to the relaxation phenomena of the applied dc field in the device constituent materials, a drift of the output signal is observed over time even when the temperature is substantially constant. As a result, the applied dc bias voltage must have feed-back control throughout the device operation to compensate for this unwanted drift. This phenomenon is called "dc drift". The dc drift tends to occur in or toward a direction canceling some of the pre-applied dc bias voltage, thus requiring the feedback controlled dc bias voltage to be increased toward a limit of operation systems. In LN modulators suppressing this unwanted dc drift over the long-term, for example in excess of 20 years, is very important. U.S. Pat. No. 5,404,412 attempts to provide a simple and practical material/device design for substantially achieving suppressed dc drift.

The effectiveness of using electrical a conductive buffer layer for suppression of dc drift was first reported with short-term experimental data in M. Gee, G. D. Thurmond, H. Blauvelt, and H. W. Yen, "Minimizing dc drift in LiNbO$_3$ waveguide devices," Appl. Phys. Lett., vol. 47 (3), 1 Aug. 1985, pp. 211–213., in which isolated indium tin oxide (ITO) transparent conductive films were formed under hot electrode and ground electrode. Since ITO has too high an electrical conductivity, it is believed that a physical separation of the ITO buffer layer between electrodes may be necessary. Notwithstanding, a highly conductive ITO buffer layer may also exhibit the problem of larger optical absorption and increase a propagation loss of optical signal. Use of a doped silicon oxide instead of ITO can properly tune buffer layer conductivity into a range demonstrating an effective dc drift suppression keeping the lateral buffer layer conductance low between the electrodes. Furthermore, since this buffer layer material is based on silicon dioxide ($SiO_2$), a possible increase of optical absorption and dielectric constant is minimized compared with common oxide conductors such as ITO, $SnO_2$, etc. The simplest device configuration with a planer buffer layer is shown in FIGS. 1 through 4 and can be simply realized.

As a suitable doping element into the silicon oxide buffer layer, U.S. Pat. No. 5,404,412 teaches metal elements of Group III to VIII, Ib and IIb of the periodic table, and demonstrates a practically suppressed drift performance with silicon dioxide doped with indium (In) and titanium (Ti). U.S. Pat. No. 5,526,448 teaches lithium (Li) and niobium (Nb) as a dopant into amorphous silicon oxide film having relatively lower optical refractive index than pure amorphous silicon oxide; and U.S. Pat. Nos. 6,661,934 and 6,654,512 teach a possible use of silicon titanium oxynitride layer as the buffer layer similarly improving temporal drift (i.e. dc drift). In this example, both of titanium and nitrogen are considered to be a dopant into silicon oxide.

BRIEF DESCRIPTION OF THE DRAWINGS

Exemplary embodiments of this invention are described in accordance with the drawings in which.

PROBLEMS OF PRIOR ART MODULATORS

However, our extensive studies on drift phenomena of LN modulators installed with a doped silicon oxide buffer layer found new problems in drift that had not been mentioned in the aforementioned prior art references. The details of the observed phenomena were published in a publication, H. Nagata, N. F. O'Brien, W. R. Bosenberg, G. L. Reiff, and K. R. Voisine, "Dc-voltage-induced thermal shift of bias point in $LiNbO_3$ optical modulators," IEEE Photonic Technol. Lett., vol. 16, issue 11, Nov. 2004, pp. 2460–2462. One problem is an asymmetric dc drift behavior with respect to an initial bias polarity. Another problem is a growth of thermal shift of bias point after biased aging. These problems found in our study are explained in FIGS. 5 through 10.

Figure 1:
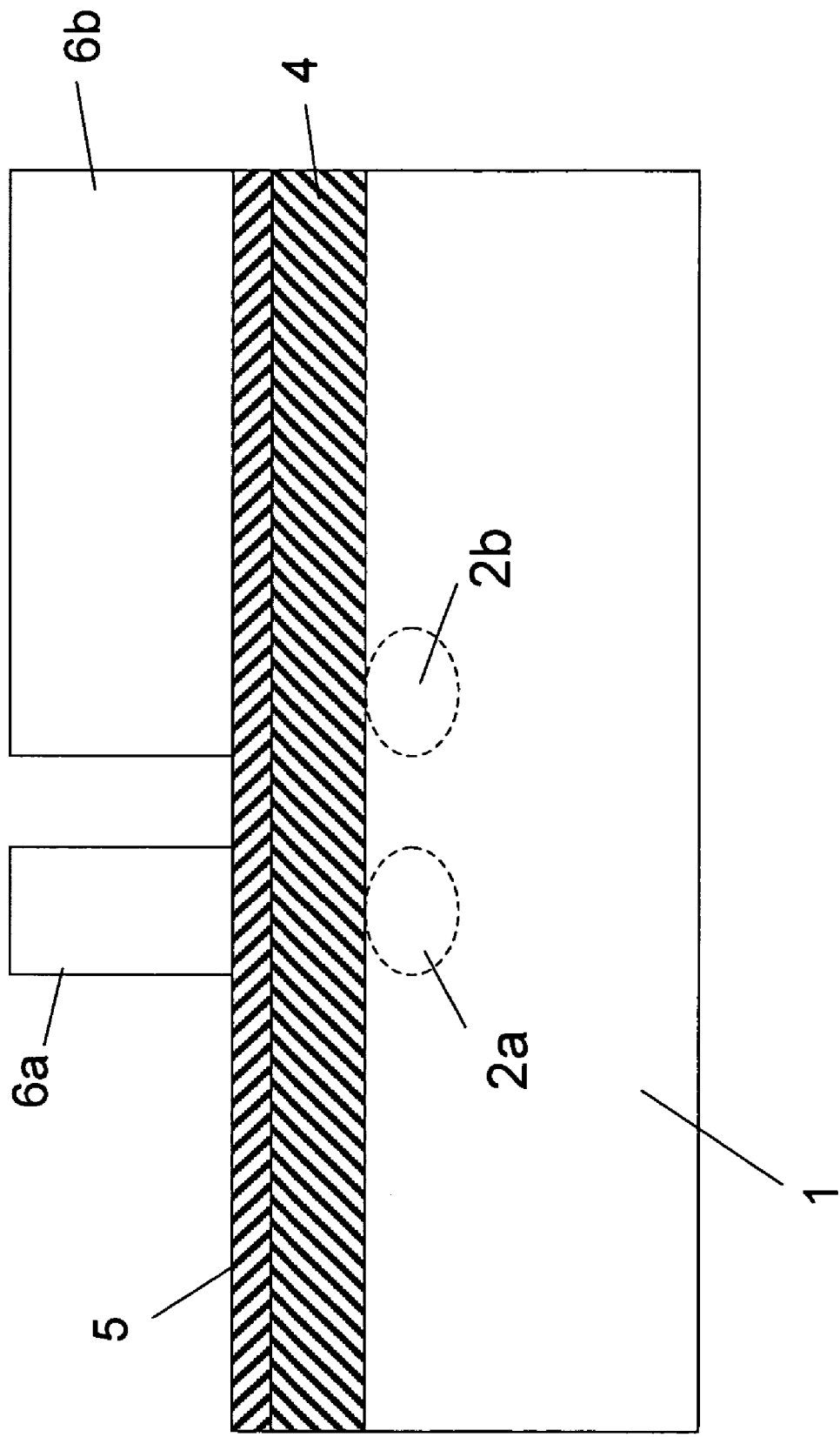
FIG. 1 is a cross sectional view of an electro-optic prior art waveguide device having a doped silicon dioxide buffer layer and a thin Si film layer over top to improve temperature characteristics.
Figure 2:
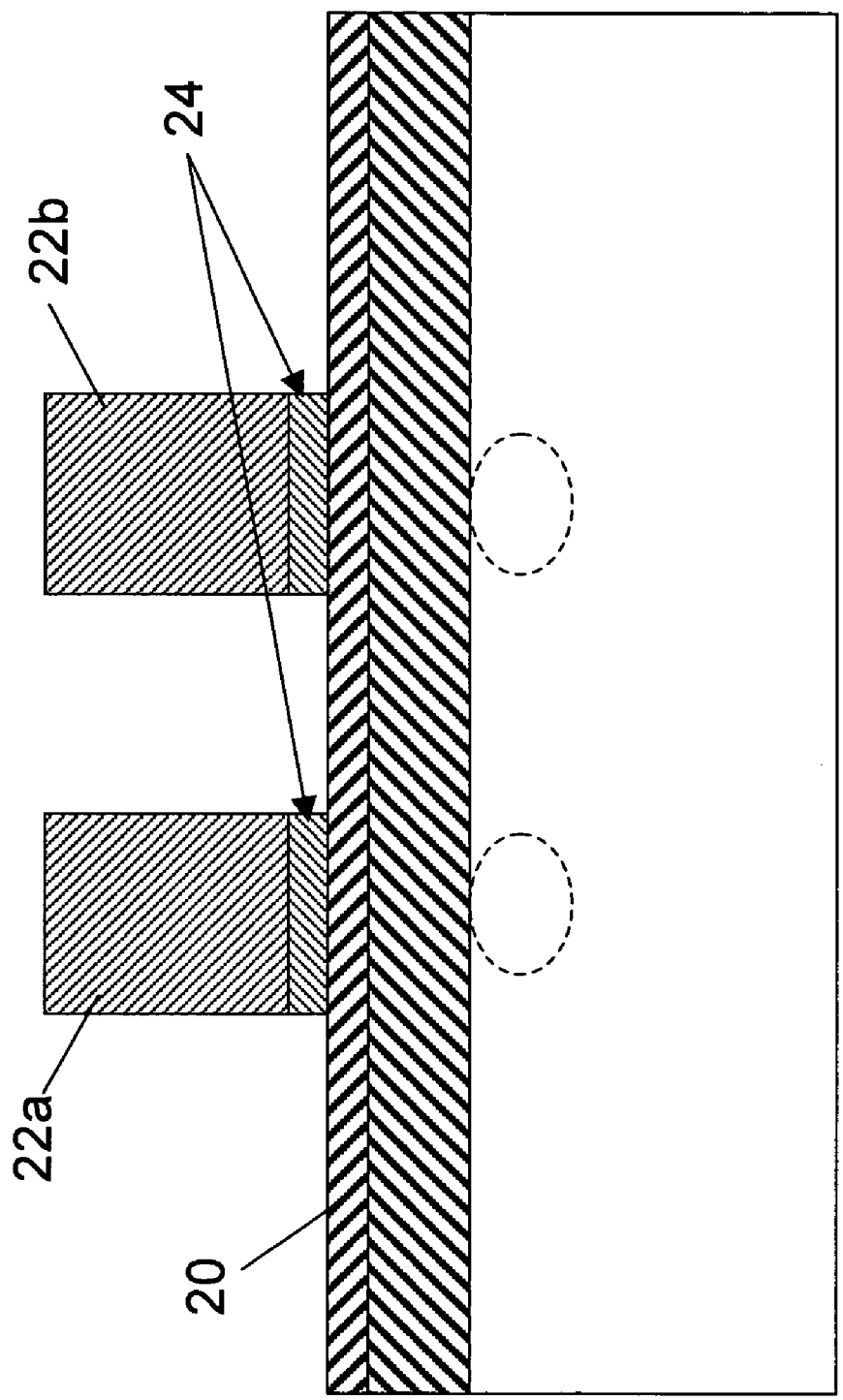
FIG. 2 is a cross sectional view of an electro-optic prior art waveguide device having buffer layer, a thin Si semiconductor layer and having a diffusion suppressing layer between the thin Si layer and electrodes.
Figure 3:
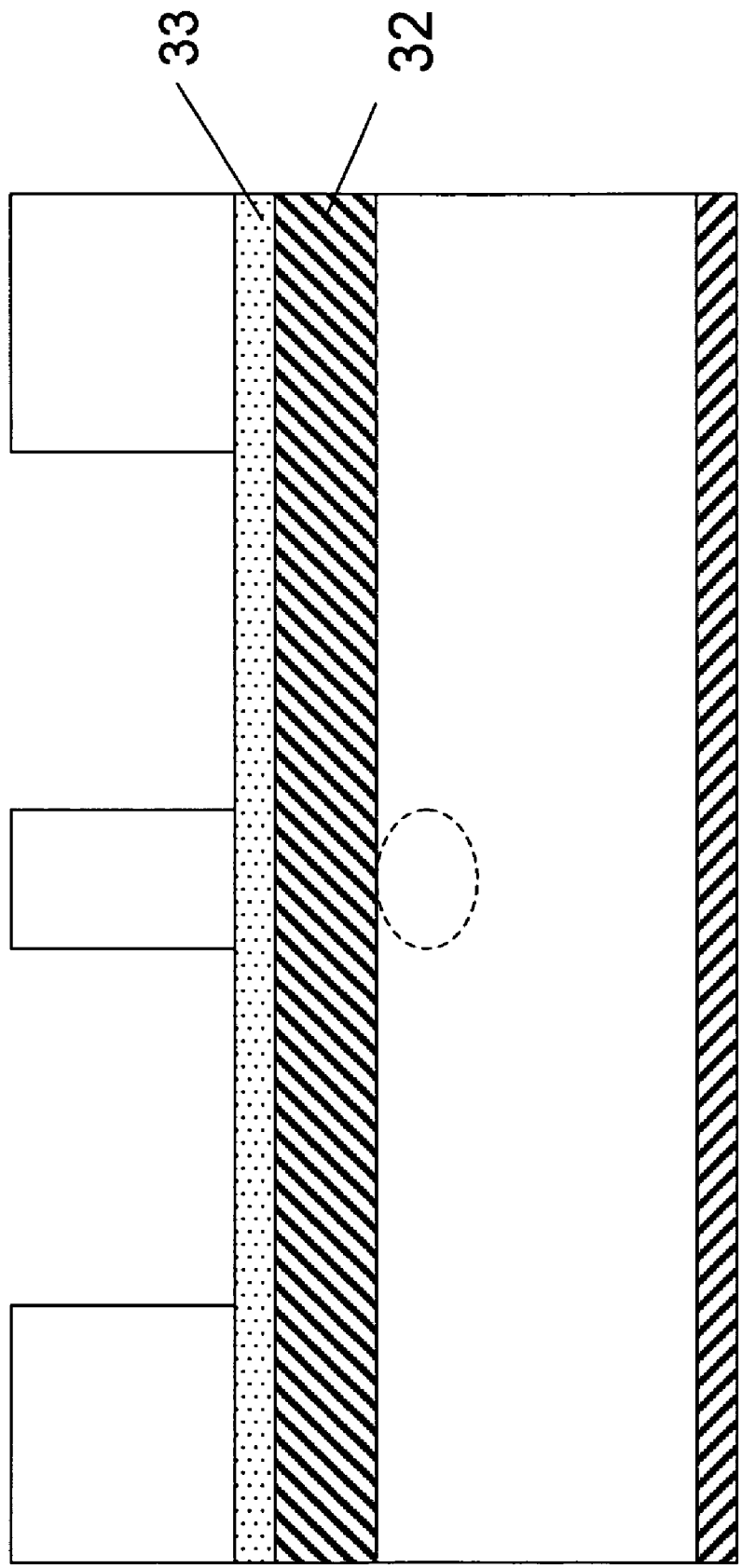
FIG. 3 is a cross sectional view of an electro-optic prior art waveguide device having a buffer layer over a LN substrate and having a surface charge dissipation layer over the buffer layer.
Figure 4:
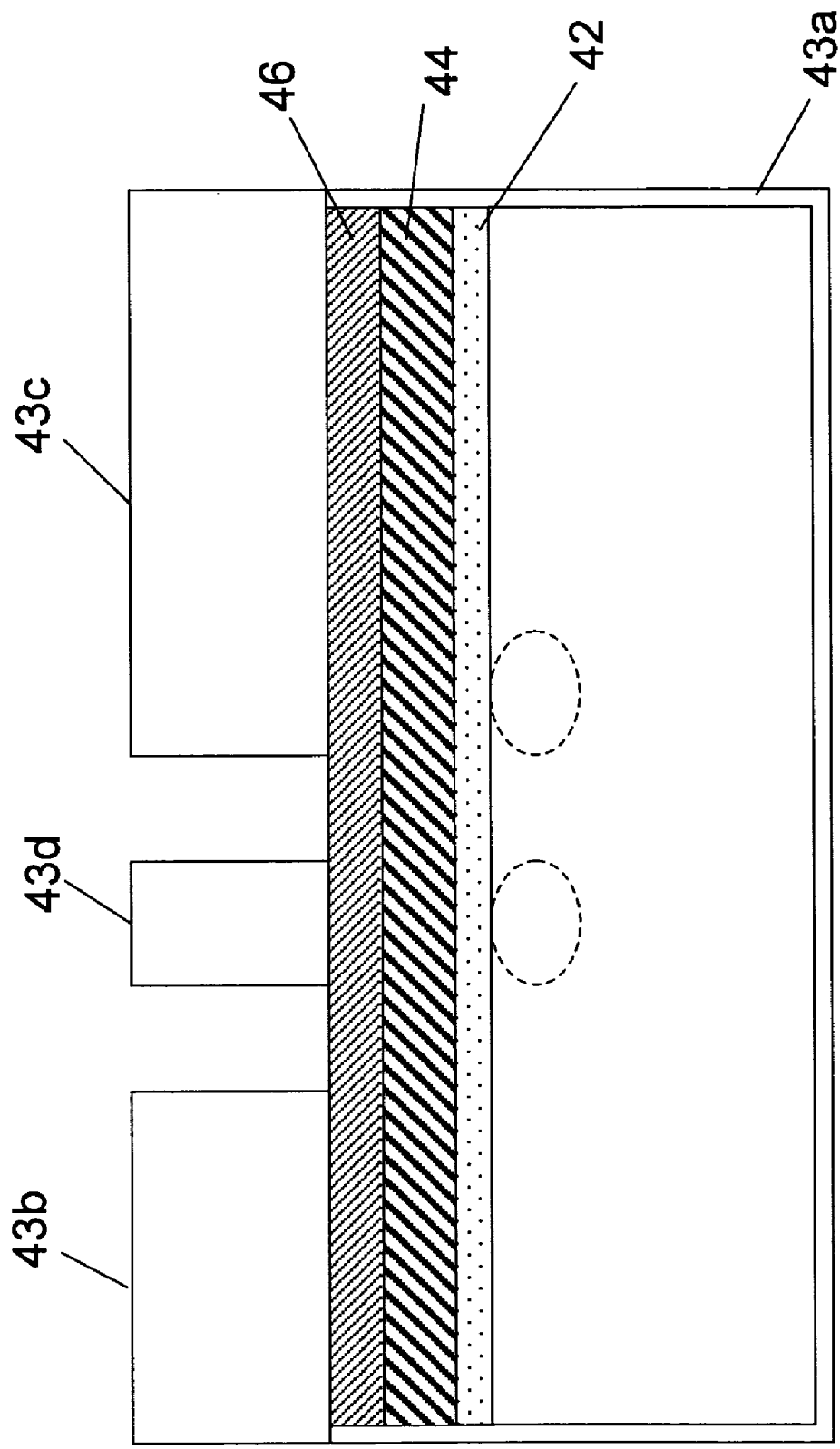
FIG. 4 is a cross sectional view of an electro-optic prior art waveguide device having an undoped $SiO_2$ buffer layer over a LN substrate and having two silicon titanium oxynitride layers over top.
Figure 5:
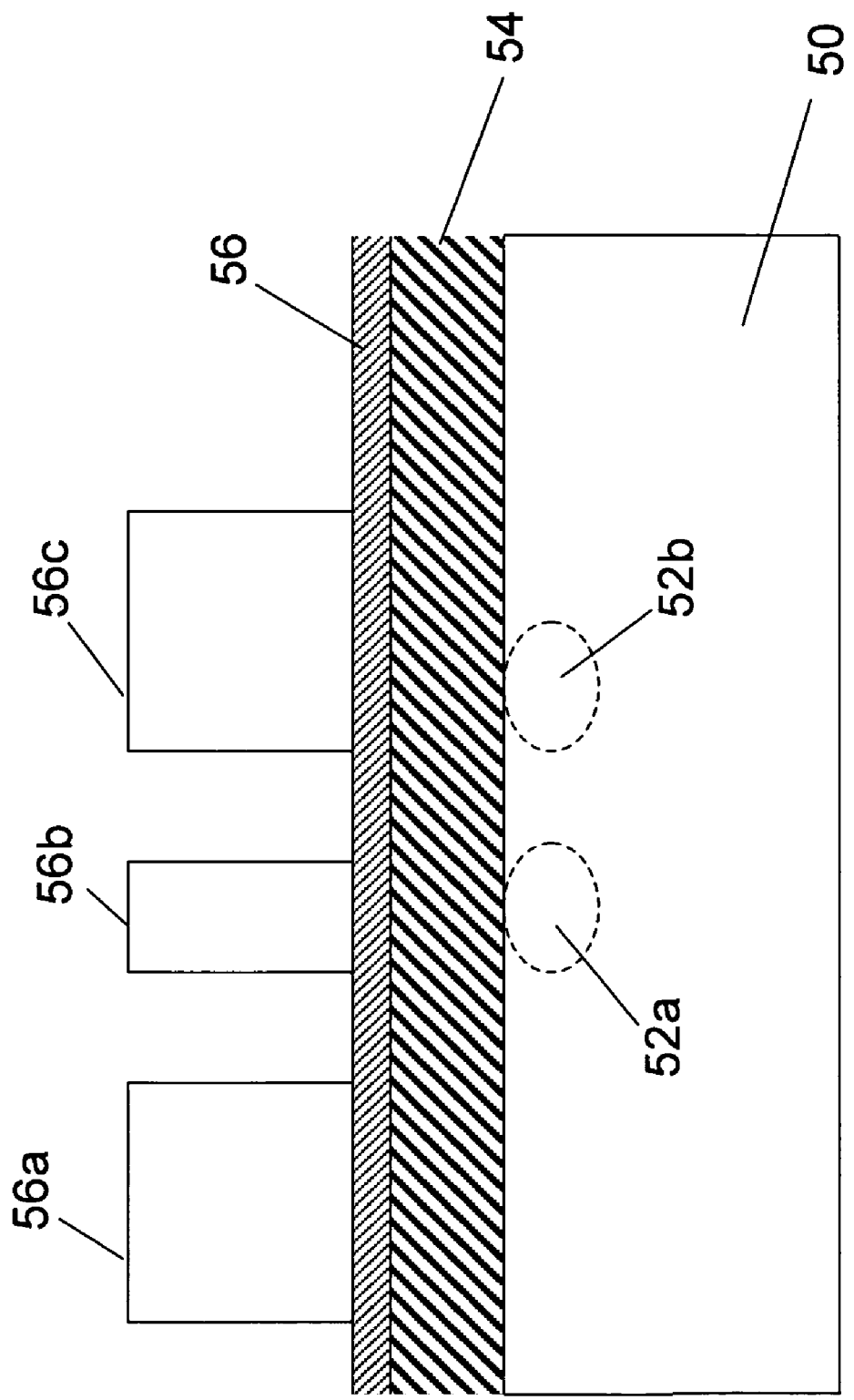
FIG. 5 is a cross sectional view of an electro-optic prior art waveguide device having a doped silicon oxide buffer layer over a LN substrate and having a non-stoichiometric bleed layer over the buffer layer.

FIG. 5 shows a most representative cross sectional structure of a prior art LN modulator, which consists of a ferroelectric crystal substrate 50 such as lithium niobate (LN) with optical waveguides 52a, and 52b within the LN substrate 50 near its surface, a doped silicon oxide buffer layer 54, a charge bleed-off layer 56, and electrodes 56a, 56b, and 56c. Indium (In) was chosen as a main dopant into the $SiO_2$ based buffer layer 54. The bleed layer 56 was made of a non-stoichiometric silicon nitride based compound or a boron doped Si, which performs a not too high but sufficiently high electrical conductivity to bleed off surface charges of the LN modulator. The Mach-Zehnder type optical waveguides 52a, and 52b were prepared by Ti-indiffusion into the surface of the LN substrate. The electrodes were gold plating. These standard design and process technologies are published in a technical review paper, E. L. Wooten, K. M. Kissa, A. Yi-Yan, E. J. Murphy, D. A. Lafaw, P. F. Hallemeier, D. R. Maack, D. V. Attanasio, D. J. Fritz, G. J. McBrien, and D. E. Bossi, "A review of lithium niobate modulators for fiber-optic communications systems," IEEE J. Selected Topics Quantum Electron., vol. 6, pp. 69–82, January/February, 2000.

Figure 6:
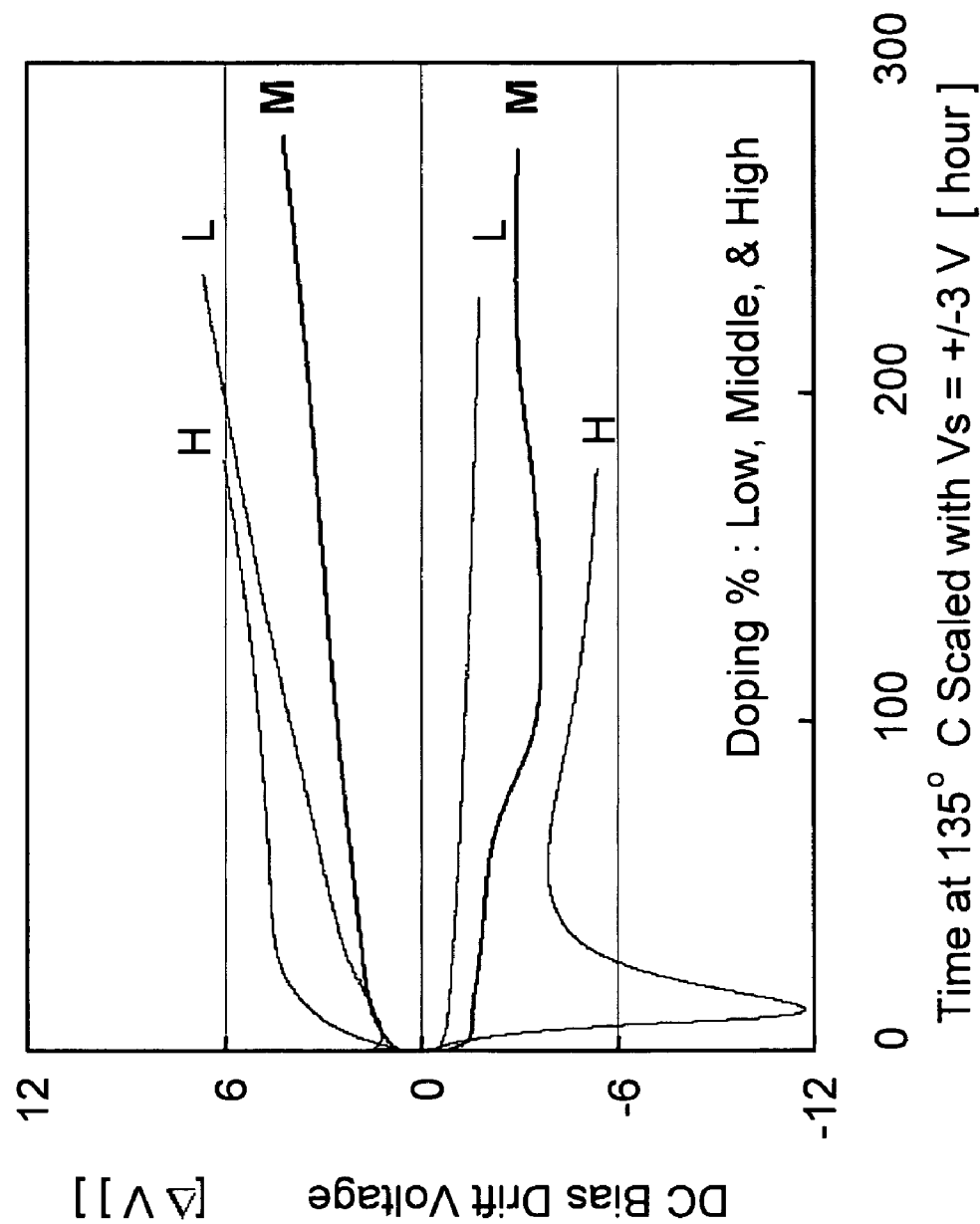
FIG. 6 is a graph of DC bias drift voltage versus time showing test results indicating problems in modulators with prior art buffer/bleed layer structures.

FIG. 6 shows dc drift behaviors of z-cut LN modulators prepared to have the cross-sectional structure shown in FIG. 5, which were tested at 135° C. in an oven kept at 135° C.; an initial bias voltage Vs=±3 V was applied to each modulator, and the applied dc bias voltages were feedback controlled in order to maintain the optical output transfer curve at the initial state. A time dependence of the drift voltage from Vs, i.e. "drift=V(t)–Vs" (V(t) denotes dc bias voltage at time t), is plotted on the graph. Six modulators from three different buffer layer materials were tested with Vs=–3 V and +3 V. The modulators "H" had the $SiO_2$-based buffer layer doped with 10~15 mol % $In_2O_3$. Doping concentration of $In_2O_3$ for the modulators "M" was designed to be 5~10 mol % level, and <5 mol % for the modulators "L". A thickness of the buffer layer was set to be about 1 μm for all samples. As is seen, the concentration of $In_2O_3$ largely affects the dc drift behavior. For example, the highly doped buffer layer exhibits a larger bump on the drift curve tested with the negative bias voltages. This bump disappears in the modulator having the buffer layer "L" with at least $In_2O_3$ doping in our experiments. However, the dc drift of the modulator "L" under positive biasing seems to become larger than that of the modulator "M". Thus, as a best guess, a less doped buffer layer may enhance the dc drift under positive biasing, even though it prevents an occurrence of the bias voltage bump under negative biasing condition and apparently suppress the drift. In order to increase a long-term reliability of LN modulators, a symmetrically suppressed dc drift behavior is preferable.

Figures 7A, 7B:
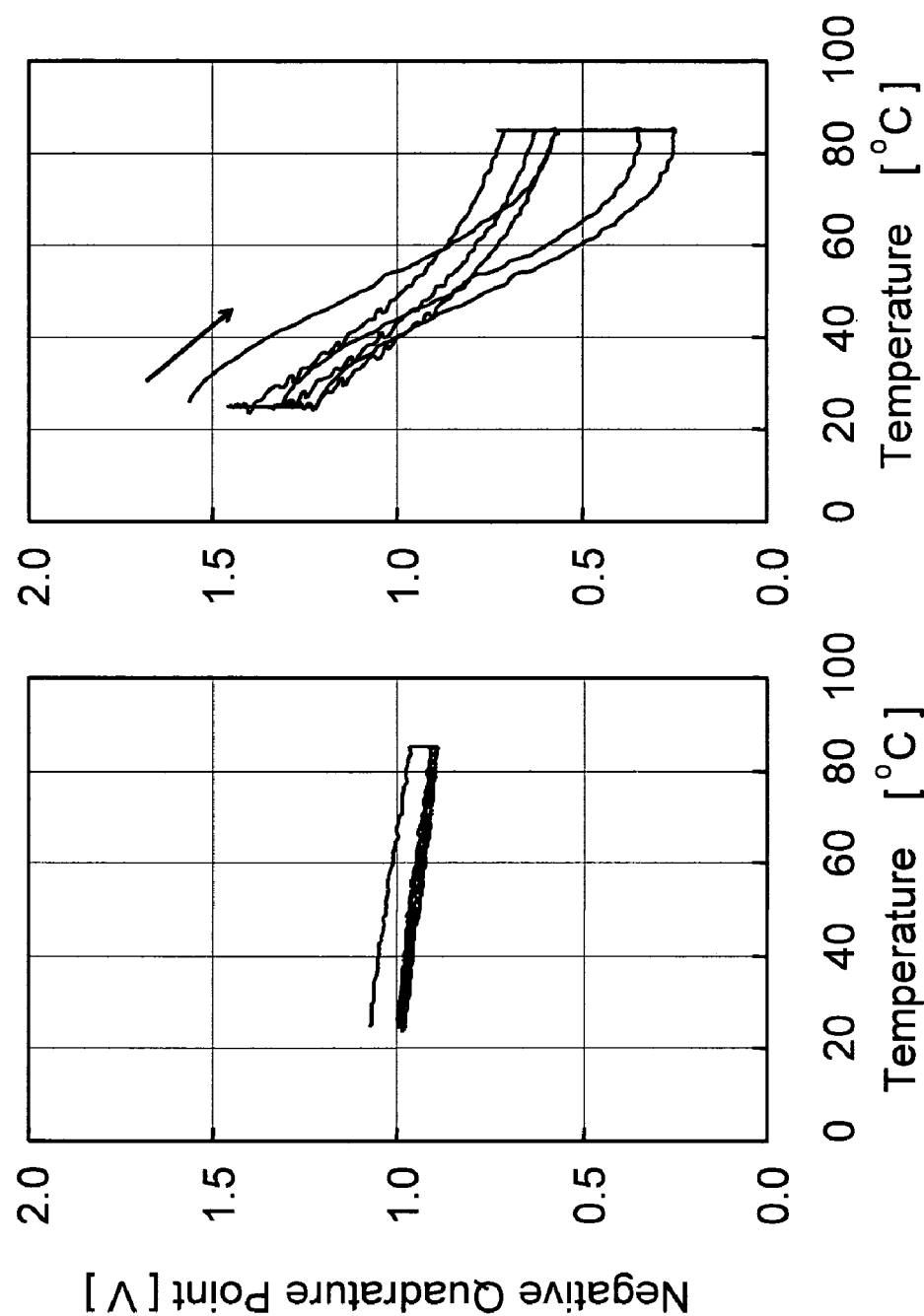
FIGS. 7a and 7b are graphs of negative quadrature point versus temperature (i.e. thermal shift) (a) before a dc drift test; and (b) after the dc drift test, respectively indicating problems in modulators with prior art buffer/bleed layer structures.

Referring now to FIGS. 7a and 7b another problem is shown that the applicant et al. found, associated with the prior art LN modulator buffer layers. FIG. 7(a) shows a temperature dependency of the bias point voltage shift measured without dc biasing with temperatures varied between 25° C. and 85° C. A temperature ramp rate was programmed to be ±1° C./min. As a bias point for the test, a quadrature point on a negative slope of the optical transfer curve was chosen. Slight mechanical stress asymmetries inevitably generated in the modulator chip appear to cause a small thermal shift of the optical output transfer curve, even without any dc biasing (i.e. in the absence of the transfer curve shift due to the dc drift). FIG. 7(b) shows the bias point thermal shift similarly tested on the same modulator without dc biasing after the dc drift test performed at 135° C. for 212 hours with Vs~+3 V. It is obvious that a magnitude of the thermal shift increased as a result of the dc drift test; i.e. a continuous dc bias application before the second thermal shift measurement. Our extensive studies on this phenomenon indicated that both of the applied dc bias voltages and the biasing time are a factors of the phenomenon, and time integrated dc bias voltages can systematically express the test data.

Figure 8:
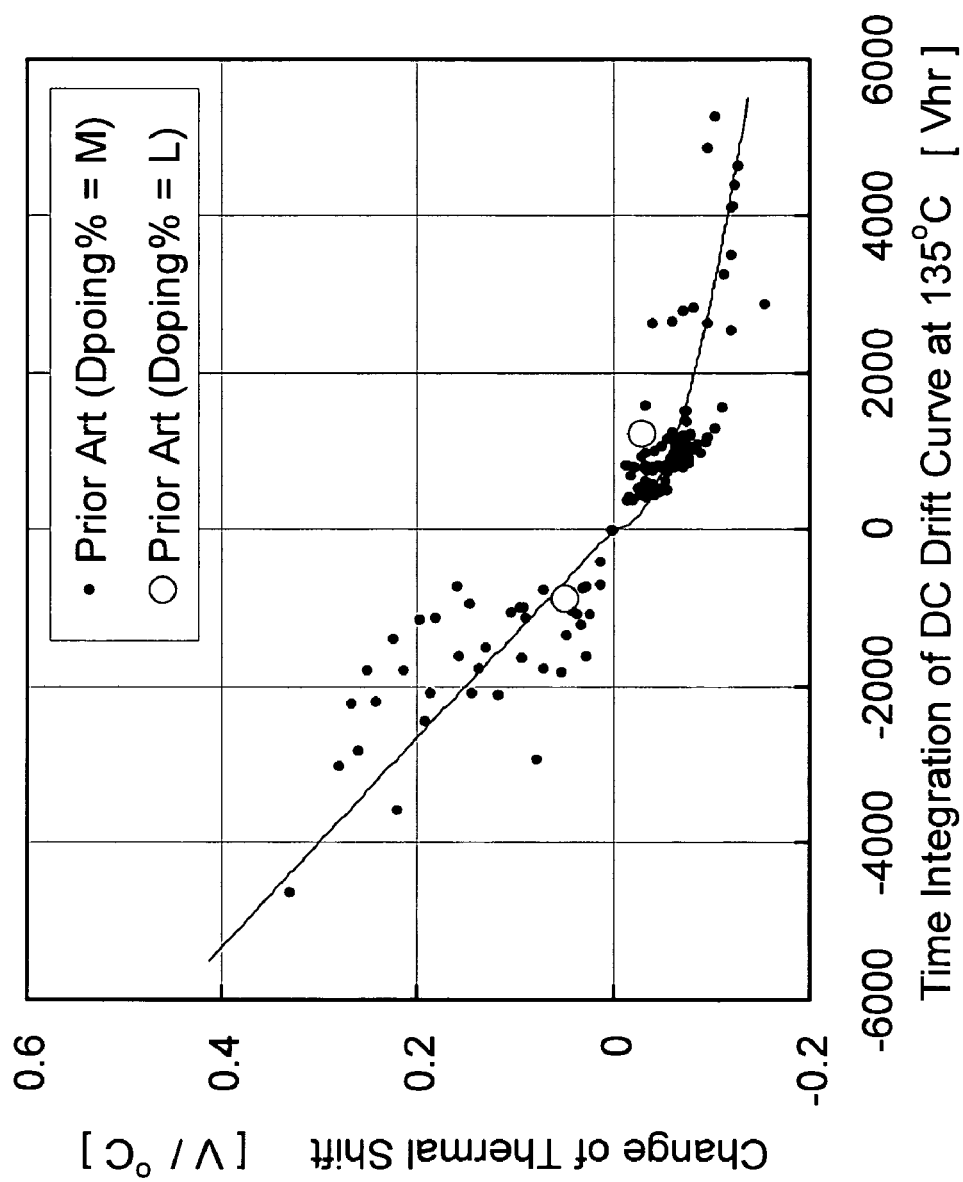
FIG. 8 is a graph of change in thermal shift versus time integration of DC drift indicating problems in modulators with prior art buffer/bleed layer structures.

FIG. 8 shows a relationship between a change of the bias point thermal shift slope detected after a certain dc drift test and a time integration of dc bias voltages throughout the dc drift test. The bias point thermal shift slope was determined by linearly fitting the measured thermal shift data between 25° C. and 85° C. The time integration of dc bias voltages was calculated from the dc drift test data at 135° C. It was confirmed on several modulator samples that a pure thermal aging at 135° C. without dc biasing does not cause any change of the bias point thermal shift slope. The small dots shown in FIG. 8 denote the results tested on z-cut LN modulators having a buffer layer "M", while two open circles denote the result on similar modulators with a buffer layer "L". A bias polarity dependency of a growth rate of the bias point thermal shift slope can be seen. The negative biasing tends to cause a larger growth.

Mechanism of Drift Problems and Concept of This Invention

Figure 9:
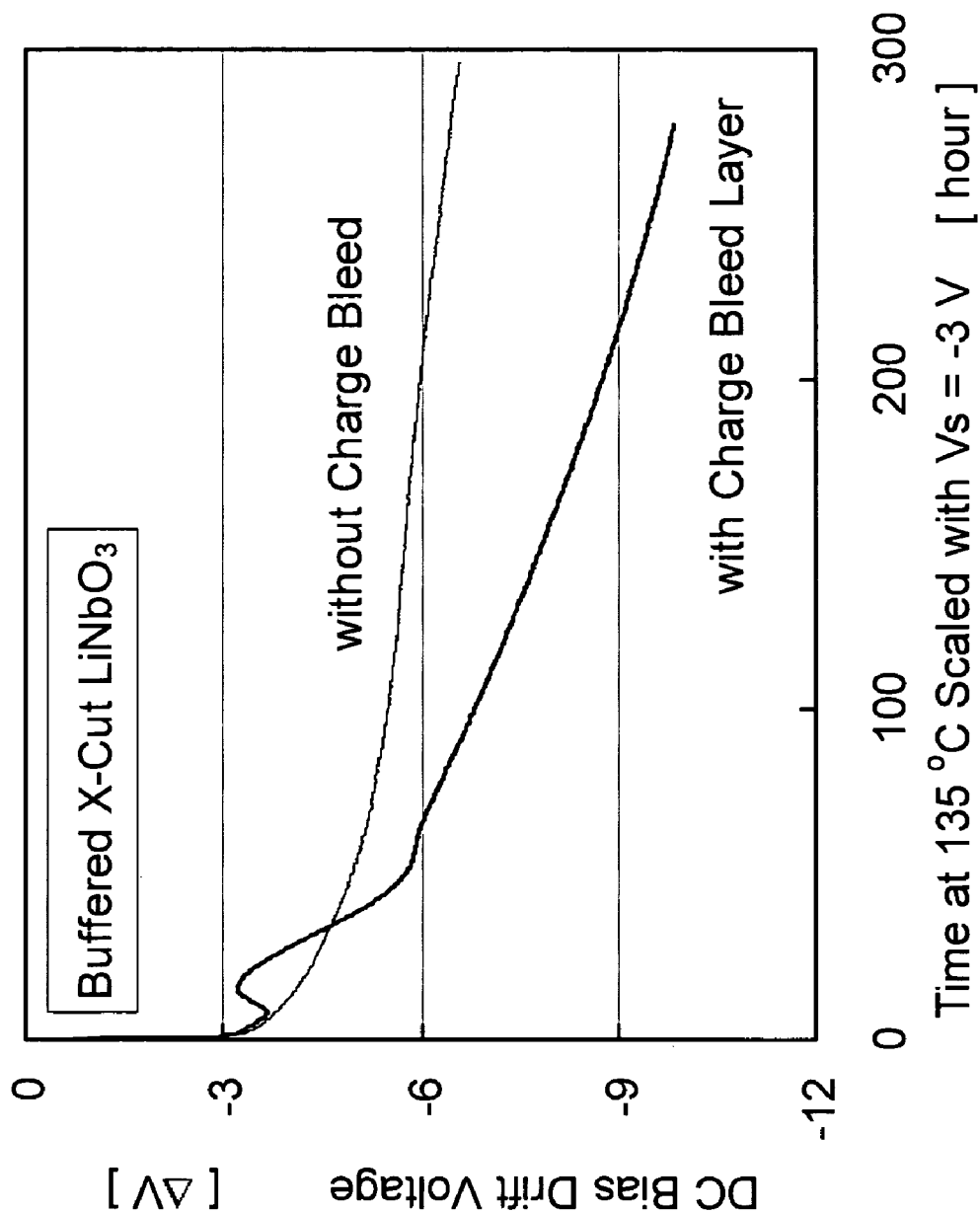
FIG. 9 is a graph of DC bias drift voltage with time depicting DC drift of X-cut LN modulators with prior art buffer/bleed layers.

FIG. 9 shows a comparison of dc drift measured on two different x-cut LN modulators. One modulator had a similar structure with the z-cut LN modulator of FIG. 5, and the x-cut LN substrate surface was coated with a doped $SiO_2$ buffer layer (composition "M" of FIG. 6) and was then further coated with a non-stoichiometric silicon nitride based charge bleed off layer. The hot electrode was formed between the Mach-Zehnder waveguide arms unlike the z-cut LN modulator configuration of FIG. 5. The other x-cut LN modulator has no charge bleed off layer, and the electrodes were formed directly on the doped $SiO_2$ buffer layer. Since pyroelectric charges are not generated on the x-cut LN surface, the x-cut LN modulator samples are useful to study to understand the effect of the bleed layer material to the drift performance. As an initial dc bias voltage, Vs=−3 V was applied to both modulator samples at 135° C. As is seen, the modulator having no charge bleed layer exhibits a monolithic dc drift profile, while the modulator with the charge bleed layer shows a larger drift accompanied with a small bump that is observed in the z-cut LN modulators "M" and "H" of FIG. 6. Thus, the presence of the charge bleed layer is considered to be a cause of the bias polarity dependency of the dc drift.

It is believed by the applicant, that one of the plausible interactions between the charge bleed layer and the doped buffer layer, is an enhancement of chemical defect generation at the interface. The doped silicon oxide buffer layer material is usually doped with metallic elements as is described in U.S. Pat. No. 5,404,412 and/or Li ion disclosed in U.S. Pat. No. 5,526,448 and/or nitrogen taught in U.S. Pat. No. 6,661,934. An inevitably introduced proton or OH ion is also considered to be a dopant, because they may affect an electrical conductivity of the buffer layer. All of these dopants may weaken the bonding strength between silicon and oxygen. Some dopants such as an alkaline ion and a proton may break the bond between silicon and oxygen. Metallic dopants such as indium may substitute silicon and bind with oxygen, but their bonding strength is usually weaker than that between silicon and oxygen. Thus, the doped silicon oxide can be considered to be a chemically unstable material. On the other hand, the charge bleed layer is usually made of Si based material such as amorphous silicon, non-stoichiometric silicon nitride, etc, in order to obtain a certain electrical conductive film with a simple film deposition process such as a reactive sputtering of silicon. When such a bleed layer material is deposited on the doped silicon oxide buffer layer, due to a high oxygen affinity of silicon atom (ion), the silicon based bleed layer may chemically reduce the buffer layer at the interface. For example, because a bonding strength between indium and oxygen (<320.1 kJ/mol, after CRC Handbook of Chemistry and Physics 83rd Edition, 2002–2003) is much weaker than that between silicon and oxygen (799.6 kJ/mol), some oxygen may diffuse into the bleed layer from the buffer layer and the oxygen defects may be generated at the interface. Generation of the defects and/or weakened bonds at the interface may enhance an occurrence of electrical breakdown via the interface and cause an abnormal drift phenomena.

Figure 10:
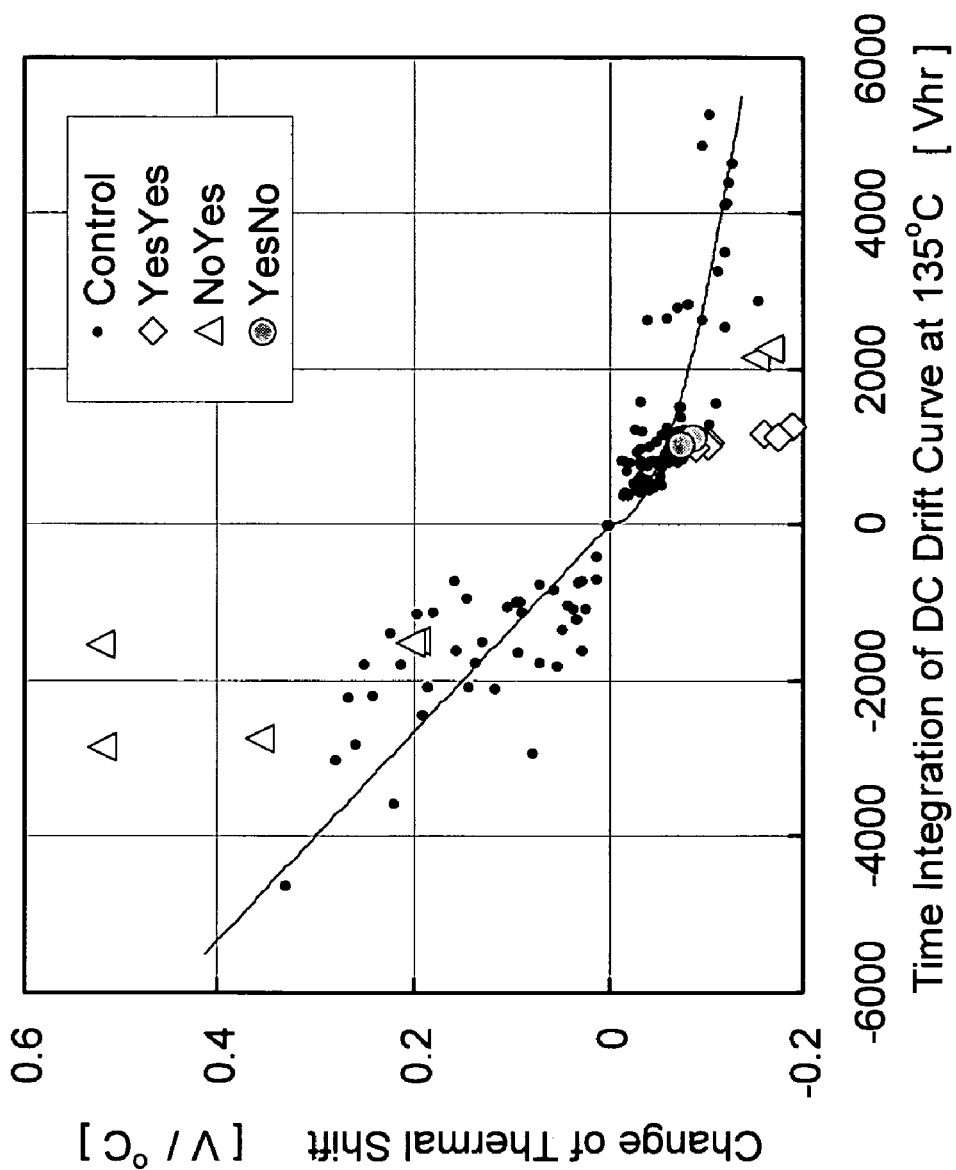
FIG. 10 is a graph of change of thermal shift with time integration of DC drift.

In order to confirm the above hypothesis, several z-cut LN modulators having intentionally generated interface-defects were specially prepared and tested. An Ar ion etching technique was used to create oxygen deficient defects onto the substrate surface before the upper layer deposition; for example the oxygen deficient defects and/or weakened chemical bonds are generated at the interface between the substrate and the upper layer. FIG. 10 shows final test results that compare the growth magnitude of bias point thermal shift after the biased aging between the standard z-cut LN modulators (same data with FIG. 8) and the specially prepared z-cut LN modulators. Small dots denote the data of standard z-cut LN modulators that were fabricated with no Ar ion etching before the buffer layer deposition and with no Ar ion etching before the bleed layer deposition (so called a "NoNo" sample hereafter). In a preparation of the "YesYes" samples marked with white diamonds in FIG. 10, the LN substrate surface was Ar ion etched before the deposition of the buffer layer, and then, the surface of the annealed buffer layer was further Ar ion etched before the deposition of the bleed layer. Similarly, "NoYes" (white triangles) and "YesNo" (gray circles) were prepared and tested. As the conclusion, "YesYes" and "NoYes" samples revealed an obviously larger growth of the bias point thermal shift than that of the standard "NoNo" modulators and "YesNo" samples. It can be concluded that an introduction of the chemical defects into the boundary between the buffer layer and the bleed layer enhances the unwanted, problematic phenomena of dc bias voltage induced growth of the bias point thermal shift. This result supports the above hypothesis.

SUMMARY OF THE INVENTION

In accordance with the invention there is provided an electro-optic waveguide device comprising:

an electro-optic substrate having one or more optical waveguides formed therein adjacent a surface thereof;

a buffer layer carried by the surface of the electro-optic substrate, a block layer supported by the buffer layer and having a greater electrical resistance than the buffer layer, for lessening temporal or thermal drift of the electro-optic waveguide device or for suppressing or lessening an unwanted chemical reaction at or near the surface of the buffer layer;

a charge bleed off layer supported by the block layer, having an amount of electrical conductivity for bleeding off electrical charges generated on or in the electro-optic waveguide device, and electrodes on the charge bleed off layer for providing electrical signals to the optical waveguides through the buffer layer, the block layer, and the charge bleed off layer.

In accordance with another aspect of the invention a method of forming an electro-optic waveguide device is provided comprising the steps of:

a) providing an electro-optic substrate;

b) forming optical waveguides near a surface of the electro-optic substrate;

c) forming a buffer layer made of a compound material based on doped silicon oxide on the surface of the electro-optic substrate;

d) forming a block layer over the buffer layer surface, wherein the block layer having a resistivity greater that the buffer layer, capable of suppressing or lessening an occurrence of chemical reactions at or near the surface of the buffer layer or capable of lessening drift current;

e) forming a charge bleed off layer on the block layer, made of either silicon based material, non-stoichiometric silicon nitride based material, or non-stoichiometric silicon oxide based material; and f) forming electrodes on the charge bleed off layer.

In accordance with another aspect of the invention an electro-optic waveguide device is provided comprising:

a four layer structure consisting of:

an electro-optic substrate having one or more optical waveguides formed therein adjacent a surface thereof;

ii) a buffer layer directly upon the surface of the electro-optic substrate, iii) a block layer supported by and contacting the buffer layer, for suppressing or lessening an unwanted chemical reaction at or near the surface of the buffer layer; and, iv) a charge bleed off layer supported by and contacting the block layer, having an amount of electrical conductivity for bleeding off electrical charges generated on or in the electro-optic waveguide device; and, electrodes on the charge bleed off layer for providing electrical signals to the optical waveguides through the buffer layer, the block layer, and the charge bleed off layer.

The concept of this invention is to suppress or lessen an occurrence of the chemical reaction between the doped silicon oxide buffer layer and the non-stoichiometric charge bleed layer material by inserting a block layer made of substantially or preferably fully stoichiometric silicon oxide and/or stoichiometric silicon nitride. Substantially stoichiometric silicon oxide is to be understood to be $SiO_{2x}$ wherein $0.9 \leq x \leq 1$ or minor variants thereof and substantially stoichiometric silicon nitride is to include $SiN_{(4/3)x}$ wherein $0.9 \leq x \leq 1$ or minor variants thereof.

The definition of stoichiometric silicon oxide (nitride) includes a film compound that is synthesized under conditions most likely giving fully oxidized (or nitrided to yield a nitride) state of silicon, and the obtained film which is substantially electrically insulative such as to be more electrically insulative or resistive than the buffer layer in performance. The block layer may not break or weaken oxygen bonds of the buffer layer, because the silicon of the block layer already binds with a sufficient amount of oxygen or nitrogen. Furthermore, because silicon has a very high oxygen (nitrogen) affinity, the interface with the bleed layer may be chemically stable, and a population of the defects generated between the block layer and the charge bleed layer may be much smaller than that between the doped silicon buffer layer and the bleed layer. The block layer in accordance with this invention can be prepared by oxygen (or nitrogen) reactive sputtering deposition of the silicon source material. The silicon oxide block layer can also be prepared by thermally annealing a thin Si film deposited on the buffer layer in an oxidizing atmosphere. The block layer may be slightly doped with boron, or phosphorus, depending on the source material of film deposition process (e.g. p-type Si such as boron doped Si, n-type Si such as phosphorus doped Si, etc).

Experimental Data of This Invention

Figure 11:
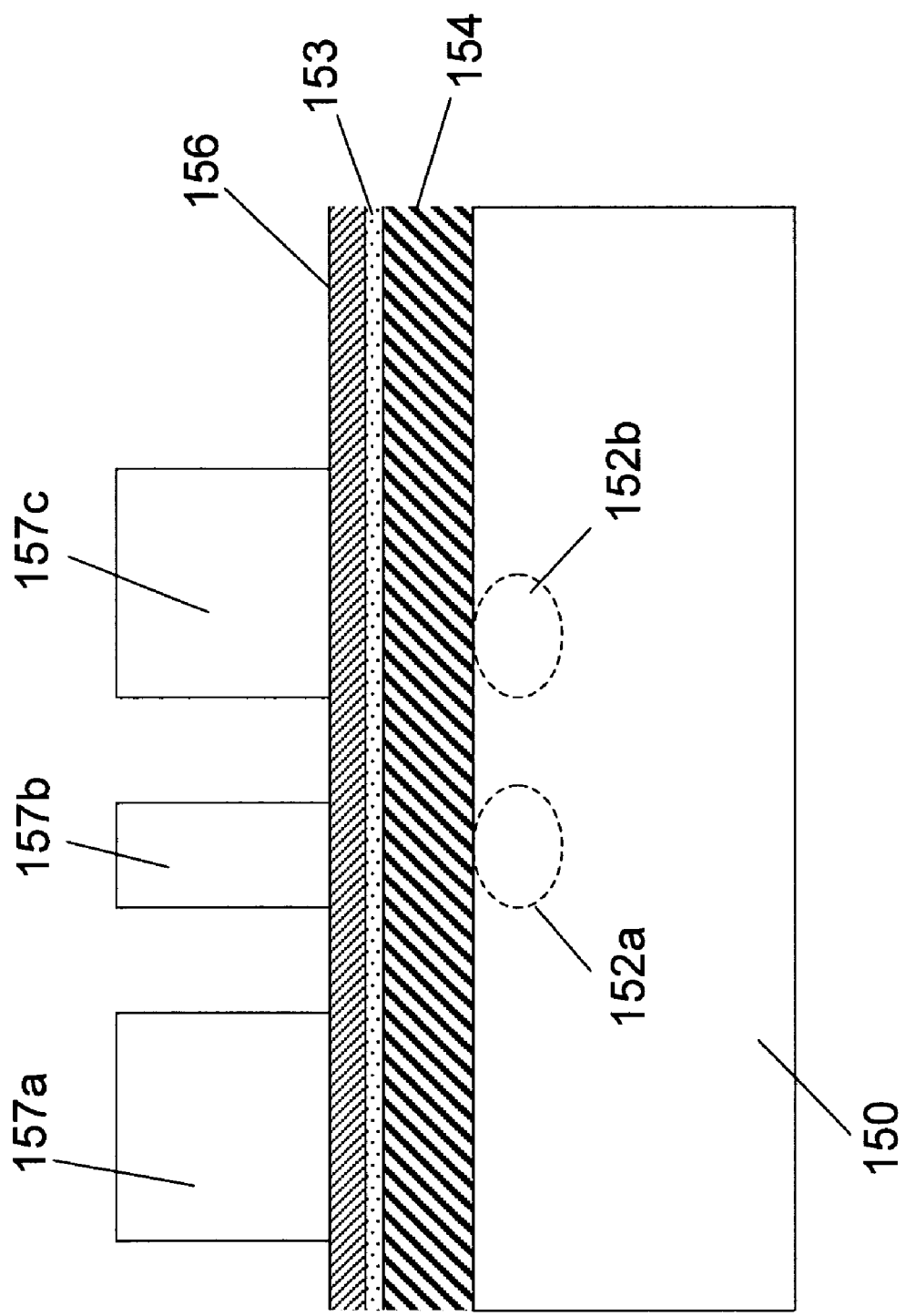
FIG. 11 is a cross sectional view of a lithium niobate modulator in accordance with this invention showing a block layer disposed between a doped silicon oxide buffer layer and a non-stoichiometric nitride and or oxide bleed layer.

FIG. 11 illustrates a cross section of the LN modulator having a LN substrate 150, waveguides 152a, 152b disposed therein, and a doped silicon oxide buffer layer 154 over top of the LN substrate 150. In accordance with this invention a block layer 153 separates the buffer layer 154 from the non-stoichiometric nitride and/or oxide bleed layer 156. Although a design of the optical waveguides 152a and 152b is shown for a z-cut LN substrate, the block layer 153 of this invention can also be applied to x-cut and y-cut LN modulators, and to similar optical modulators using other electro-optic waveguide substrate materials such as $LiTaO_3$, etc. Similarly, this invention can be applied to any kind of doped silicon buffer layers usable for electro-optic waveguide modulators, such as an indium oxide doped silicon dioxide buffer layer, etc. Other film preparation methods that can achieve a substantial stoichiometric chemical state of a silicon based nitride and/or oxide compound, can be applied to forming the block layer on the doped silicon buffer layer. Electrodes 157a, 157b, and 157c are disposed over the bleed layer 156.

Figure 12:
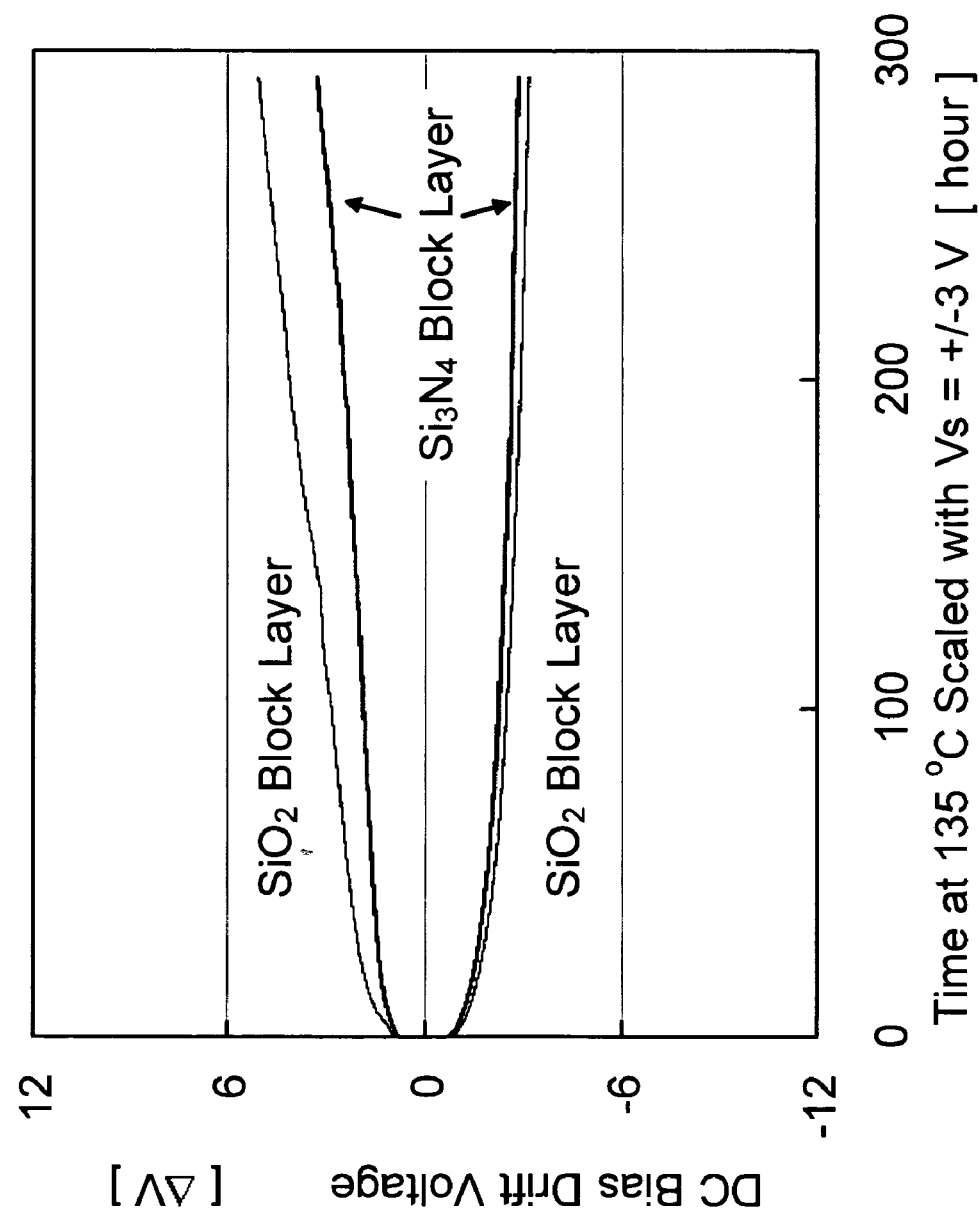
FIG. 12 is a graph of DC bias drift voltage versus time at 135 degrees C. showing improved test results for this invention.

FIG. 12 shows the dc drift test results at 135° C. with Vs=±3 V measured on four z-cut LN modulators having two different block layers in accordance with this invention between the doped silicon dioxide buffer layer with composition "M" and the non-stoichiometric silicon nitride based charge bleed layer. After the oxygen atmosphere annealing of the doped silicon oxide buffer layer (~1 μm thick), the block layer was prepared on the buffer layer by reactive rf-sputtering of the silicon target with $Ar/O_2$ or $Ar/N_2$. No Ar ion etching of the buffer layer surface was performed before the block layer deposition. The sputtering pressure was set at 12.5 mTorr, while gas flow rates of Ar and $O_2$ ($N_2$) were set at 100 sccm and 10 sccm, respectively. The z-cut LN substrate with the annealed buffer layer was not intentionally heated throughout the block layer deposition process. Prior to the modulator sample preparation, it had been confirmed that the above reactive rf-sputtering condition could deposit an almost completely oxidized or nitrified silicon compound film (i.e. almost stoichiometric $SiO_2$ or $Si_3N_4$ film), judging from its electrically insulative performance and optical transparency. A thickness of the $SiO_2$ ($Si_3N_4$) block layer was set to be about 25 nm. After the block layer deposition, the charge bleed layer was directly deposited on the block layer, and followed by electrode formation processes. As is seen in FIG. 12, the both $SiO_2$ and $Si_3N_4$ block layer eliminated the bump of the negatively biased dc drift curve (see FIG. 6 for prior art modulators) and greatly improved a the symmetry of the dc drift profile with respect to the bias polarity.

Figure 13:
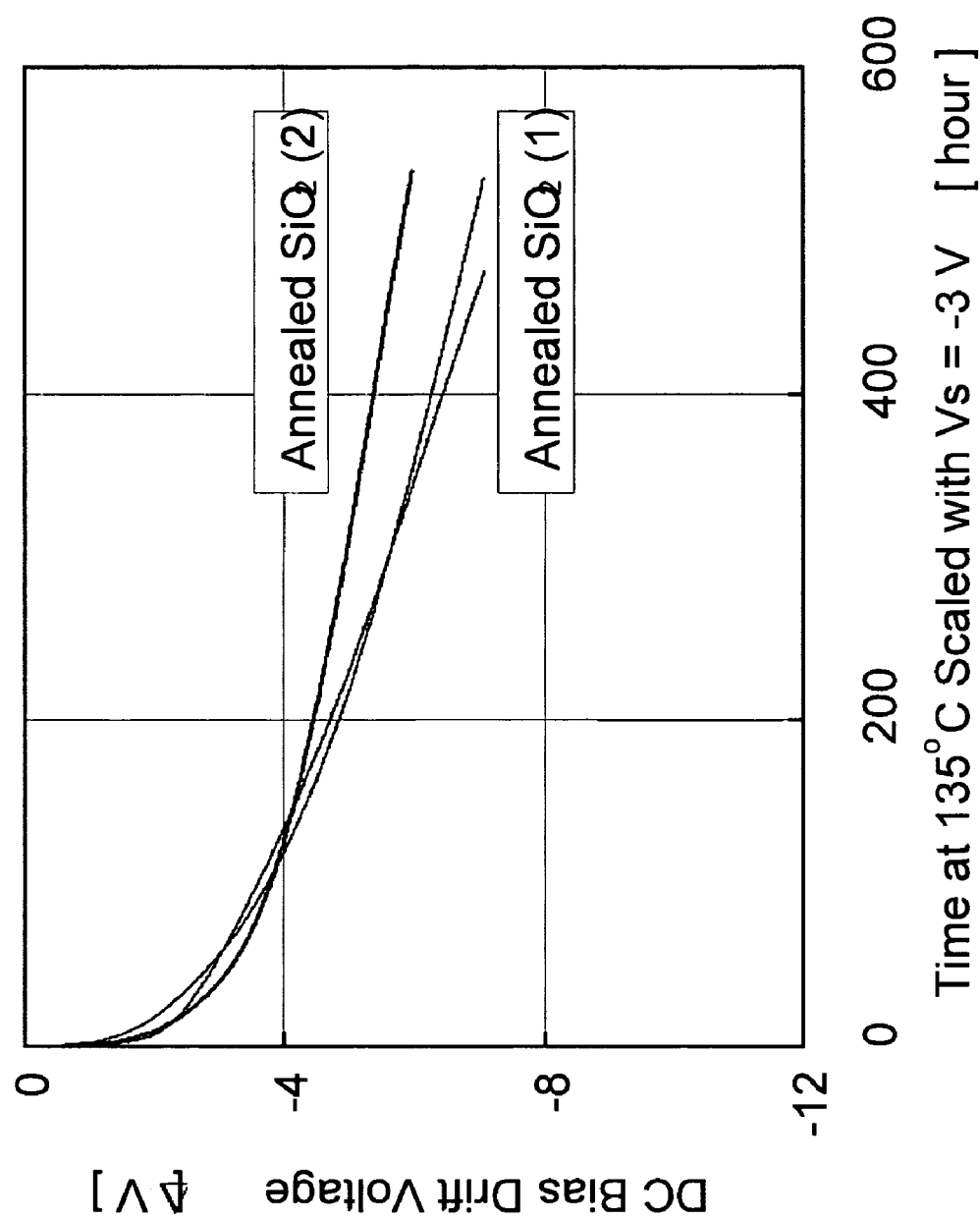
FIG. 13 is a graph of DC bias drift voltage versus time at 135 degrees C. showing improved test results for this invention wherein the $SiO_2$ layer was annealed in two instances.

FIG. 13 reveals dc drift test results with Vs=−3 V at 135° C. for ~500 hours, obtained for other block layer examples that were prepared by oxygen annealing of a thin silicon film rf-sputtering deposited on the ~1 µm thick doped silicon oxide buffer layer on the z-cut LN waveguide substrate. The first block layer example, $SiO_2$ (1) of FIG. 13 was prepared by 5-hour-oxygen annealing at 600° C. of the 8~9 nm thick amorphous silicon film that had been deposited on the 600-° C.-oxygen annealed doped silicon dioxide buffer layer. On the other hand, in a preparation of the second block layer example, $SiO_2$ (2) of FIG. 13, a ~2 nm thick amorphous silicon film had been deposited on the ~1 µm thick as-deposited doped silicon oxide buffer layer before the buffer layer annealing, and then, the films were annealed at 600° C. in a flowing $O_2$ atmosphere in order to fully oxidize both buffer layer and block layer films at a same time into a binary film composed of the doped silicon dioxide buffer layer and the $SiO_2$ blocking layer. A post anneal thickness of the block layer was not measured. It is obvious that the $SiO_2$ block layer prepared by thermal oxidation instead of the reactive rf-sputtering can also remove the bump from the negatively biased dc drift curve.

Figure 14:
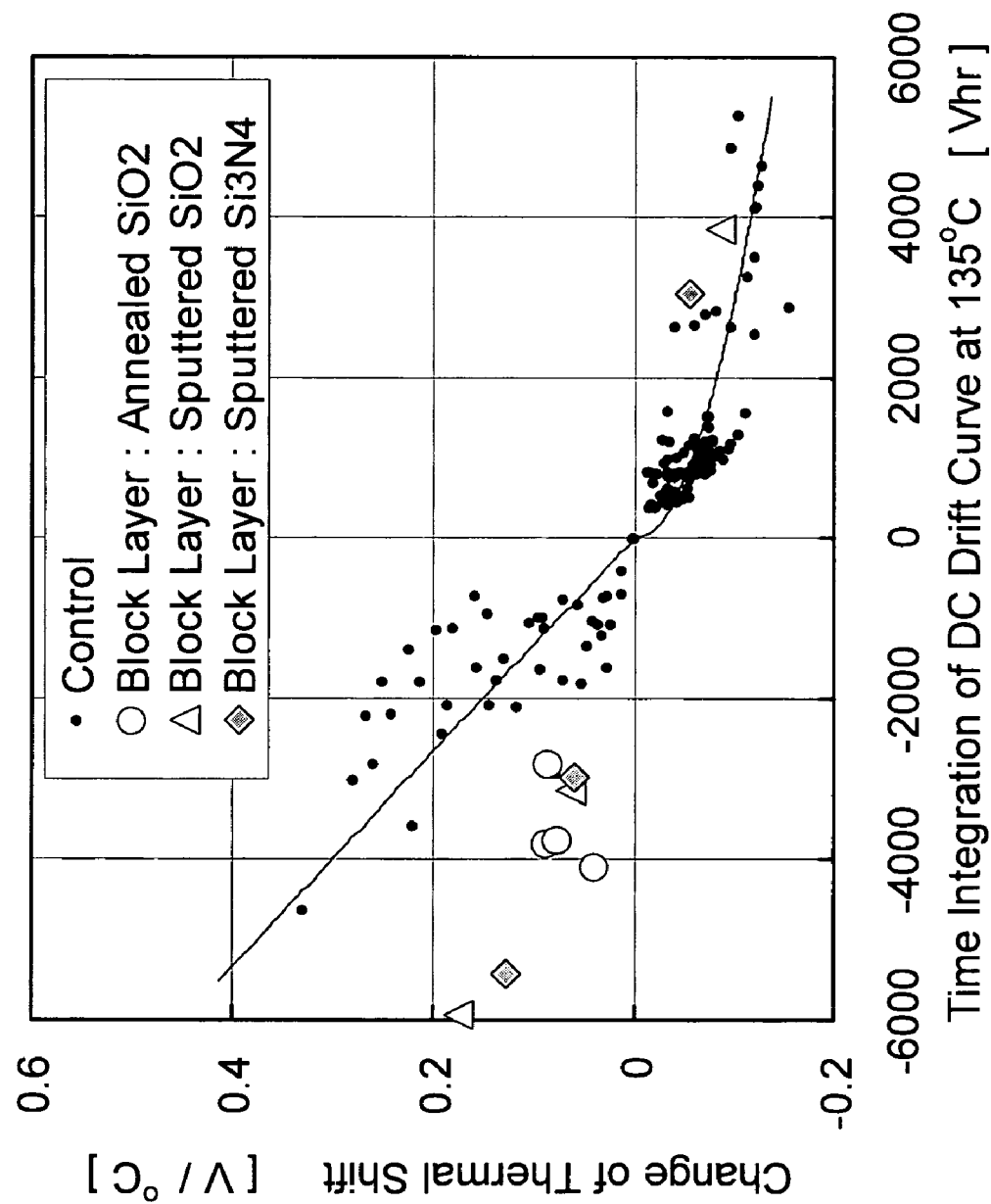
FIG. 14 is a graph of change in thermal shift versus time integration of DC drift for this invention.

The block layer of this invention provides a solution to another drift problem of dc bias voltage induced growth of bias point thermal shift (see FIGS. 7a, 7b and 8 of the prior art). The same unbiased bias point thermal shift measurements as were performed on the prior art modulator samples were applied to the samples of FIGS. 12 and 13 of this invention. Finally obtained results are shown in FIG. 14 with white circles (annealed $SiO_2$ block layer of FIG. 13), white triangles (reactive rf-sputtering deposited $SiO_2$ block layer of FIG. 12), and gray diamonds (reactive rf-sputtering deposited $Si_3N_4$ block layer of FIG. 12). For comparison, data points of the prior art samples (i.e. no block layer) are plotted with small dots. The block layer achieves an obvious improvement of the bias point thermal shift growth rate, especially under negatively dc biased operation condition.

Figure 15:
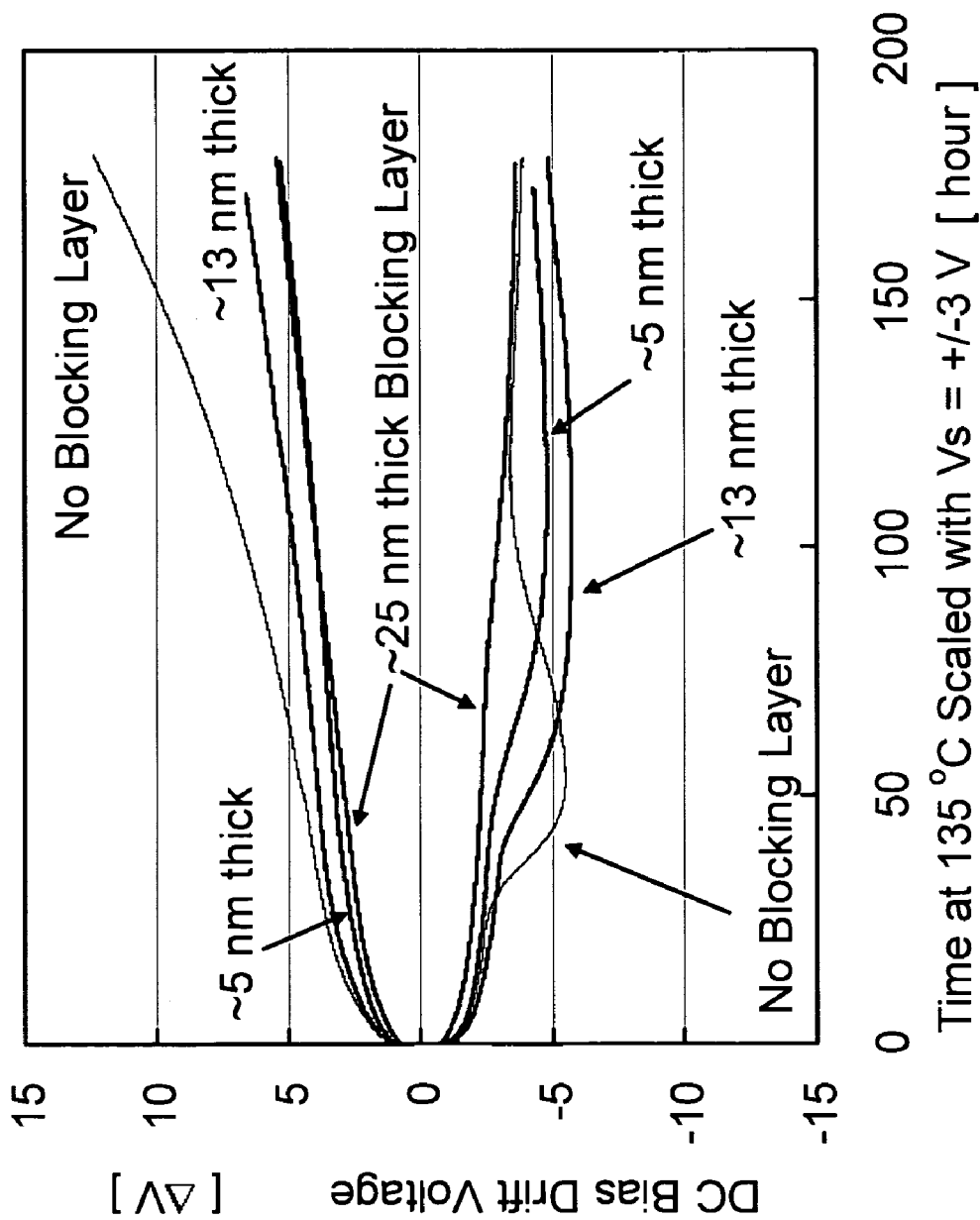
FIG. 15 is a graph of DC bias drift voltage versus time at 135 degree C. showing improved test results for this invention wherein a thickness of the block layer was varied from zero to 5 nm, 13 nm, and 25 nm.

Finally, concerning the reactive rf-sputtering deposited $Si_3N_4$ block layer, the effect of the block layer thickness was investigated. The sample configuration was almost same as that of FIG. 12, except for a chemical composition of the doped silicon dioxide buffer layer. Although the composition had not been measured before the sample preparation, this buffer layer might include slightly more $In_2O_3$ dopant than the modulator samples of FIGS. 9, 12, and 13, and exhibited slightly larger baseline dc drifts as shown in FIG. 15 with two dc drift curves denoted as "No Blocking Layer" (i.e. dc drift measured on control samples). Six other curves shown in FIG. 15 reveal the dc drifts measured on the test samples having three different thickness block layers. The $Si_3N_4$ block layer thickness was varied to be about 5 nm, 13 nm, and 25 nm, by changing the film deposition time. As is seen, an insertion of the 5 nm thick block layer can significantly suppress the dc drift under positive biasing, although the thickness is not sufficient to remove the bump from the negatively driven dc drift curves. In order to suppress or eliminate the bump of the negatively driven dc drift curve, an at least 25 nm thick $Si_3N_4$ blocking layer is necessary. However, a suitable thickness of the block layer may change depending on materials of the buffer layer and charge bleed layer, film deposition process conditions.

What is claimed is:

1. An electro-optic waveguide device comprising:
an electro-optic substrate having one or more optical waveguides formed therein adjacent a surface thereof;
a buffer layer carried by the surface of the electro-optic substrate,
a block layer supported by the buffer layer and having a greater electrical resistance than the buffer layer, for lessening temporal or thermal drift of the electro-optic waveguide device or for suppressing or lessening an unwanted chemical reaction at or near the surface of the buffer layer;
a charge bleed off layer supported by the block layer, having an amount of electrical conductivity for bleeding off electrical charges generated on or in the electro-optic waveguide device, and
electrodes on the charge bleed off layer for providing electrical signals to the optical waveguides through the buffer layer, the block layer, and the charge bleed off layer, wherein the buffer layer is formed upon the surface of the electro-optic substrate, the block layer is formed upon the buffer layer, and the charge bleed layer is formed upon the block layer wherein the buffer layer is made of a doped silicon oxide compound material comprising a majority part of silicon oxide and any dopants giving a relatively higher electrical conductivity than pure silicon oxide.

2. An electro-optic waveguide device as defined in claim 1, wherein the charge bleed layer is made of a silicon based material.

3. An electro-optic waveguide device as defined in of claim 1 wherein the electro-optic substrate is lithium niobate.

4. An electro-optic waveguide device comprising:
an electro-optic substrate having one or more optical waveguides formed therein adjacent a surface thereof;
a buffer layer carried by the surface of the electro-optic substrate,
a block layer supported by the buffer layer and having a greater electrical resistance than the buffer layer, for lessening temporal or thermal drift of the electro-optic waveguide device or for suppressing or lessening an unwanted chemical reaction at or near the surface of the buffer layer;
a charge bleed off layer supported by the block layer, having an amount of electrical conductivity for bleeding off electrical charges generated on or in the electro-optic waveguide device, and
electrodes on the charge bleed off layer for providing electrical signals to the optical waveguides through the buffer layer, the block layer, and the charge bleed off layer, wherein the buffer layer is formed upon the surface of the electro-optic substrate, the block layer is formed upon the buffer layer, and the charge bleed layer is formed upon the block layer, and wherein the block layer is comprised of a compound material based on stoichiometric silicon oxide or substantially stoichiometric silicon oxide of the composition $SiO_{2x}$ wherein $0.9 \leq x \leq 1$ that performs electrical insulative characteristics.

5. An electro-optic waveguide device comprising:
an electro-optic substrate having one or more optical waveguides formed therein adjacent a surface thereof;
a buffer layer carried by the surface of the electro-optic substrate,
a block layer supported by the buffer layer and having a greater electrical resistance than the buffer layer, for lessening temporal or thermal drift of the electro-optic waveguide device or for suppressing or lessening an unwanted chemical reaction at or near the surface of the buffer layer;
a charge bleed off layer supported by the block layer, having an amount of electrical conductivity for bleeding off electrical charges generated on or in the electro-optic waveguide device, and
electrodes on the charge bleed off layer for providing electrical signals to the optical waveguides through the buffer layer, the block layer, and the charge bleed off layer, wherein the buffer layer is formed upon the surface of the electro-optic substrate, the block layer is formed upon the buffer layer, and the charge bleed layer is formed upon the block layer, and wherein the block layer is comprised of a compound material based on stoichiometric silicon nitride or substantially stoichiometric silicon nitride of the composition $SiO_{(4/3)x}$ wherein $0.9 \leq x \leq 1$ that performs electrical insulative characteristics.

6. An electro-optic waveguide device comprising:
an electro-optic substrate having one or more optical waveguides formed therein adjacent a surface thereof;
a buffer layer carried by the surface of the electro-optic substrate,
a block layer supported by the buffer layer and having a greater electrical resistance than the buffer layer, for lessening temporal or thermal drift of the electro-optic waveguide device or for suppressing or lessening an unwanted chemical reaction at or near the surface of the buffer layer;
a charge bleed off layer supported by the block layer, having an amount of electrical conductivity for bleeding off electrical charges generated on or in the electro-optic waveguide device, and
electrodes on the charge bleed off layer for providing electrical signals to the optical waveguides through the buffer layer, the block layer, and the charge bleed off layer, wherein the buffer layer is formed upon the surface of the electro-optic substrate, the block layer is formed upon the buffer layer, and the charge bleed layer is formed upon the block layer, wherein the charge bleed off layer is made of a compound material based on non-stoichiometric silicon nitride and/or non-stoichiometric silicon oxide.

7. A method of forming an electo-optic waveguide device comprising the steps of:
a) providing an electro-optic substrate;
b) forming one or more optical waveguides near a surface of the electro-optic substrate;
c) forming a buffer layer made of a compound material based on doped silicon oxide on the surface of the electro-optic substrate;
d) forming a block layer over the buffer layer surface, capable of suppressing or lessening an occurrence of chemical reactions at or near the surface of the buffer layer;
e) forming a charge bleed off layer on the block layer, made of either silicon based material, non-stoichiometric silicon nitride based material, or non-stoichiometric silicon oxide based material; and
f) forming electrodes on the charge bleed off layer.

8. A method of forming an electro-optic waveguide device as defined in claim 7 wherein the block layer is a stoichometric or substantially stoichiometric silicon oxide or silicon nitride.

9. A method of forming an electo-optic waveguide device comprising the steps of:
a) providing an electro-optic substrate;
b) forming one or more optical waveguides near a surface of the electro-optic substrate;
c) forming a buffer layer made of a compound material based on doped silicon oxide on the surface of the electro-optic substrate;
d) forming a block layer over the buffer layer surface, capable of suppressing or lessening an occurrence of chemical reactions at or near the surface of the buffer layer;
e) forming a charge bleed off layer on the block layer, made of either silicon based material, non-stoichiometric silicon nitride based material, or non-stoichiometric silicon oxide based material; and
f) forming electrodes on the charge bleed off layer, wherein the block layer is made of a material having the composition $SiO_{2x}$ wherein $0.9 \leq x \leq 1$ or $Sin_{(4/3)x}$ wherein $0.9 \leq x \leq 1$.

10. A method as defined in claim 9, wherein the block layer is more resistive than the buffer layer.

11. The method in accordance with claim 9, wherein the step of forming the block layer is a reactive film deposition method such as reactive sputtering of a silicon based material with a reactive gas mixture such as $Ar/N_2$ and $Ar/O_2$.

12. The method in accordance with claim 9 wherein the step of forming the block layer is an ex-situ method comprising the steps of:
depositing a silicon based film on the buffer layer and allowing a thermal reaction of the deposited silicon based film.

13. An electro-optic waveguide device comprising:
a four layer structure consisting of:
i) an electro-optic substrate having one or more optical waveguides formed therein;
ii) a buffer layer directly upon a surface of the electro-optic substrate,
iii) a block layer supported by and contacting the buffer layer, for suppressing or lessening an unwanted chemical reaction at or near the surface of the buffer layer; and,
iv) a charge bleed off layer supported by and contacting the block layer, having an amount of electrical conductivity for bleeding off electrical charges generated on or in the electro-optic waveguide device; and,
electrodes on the charge bleed off layer for providing electrical signals to the optical waveguides through the buffer layer, the block layer, and the charge bleed off layer, wherein the block layer is $SiO_{2x}$ wherein $0.9 \leq x \leq 1$ or $SiN_{(4/3)x}$ wherein $0.9 \leq x \leq 1$.

14. An electro-optic waveguide device comprising:
a four layer structure consisting of:
i) an electro-optic substrate having one or more optical waveguides formed therein;
ii) a buffer layer directly upon a surface of the electro-optic substrate,
iii) a block layer supported by and contacting the buffer layer, for suppressing or lessening an unwanted chemical reaction at or near the surface of the buffer layer; and,
iv) a charge bleed off layer supported by and contacting the block layer, having an amount of electrical conductivity for bleeding off electrical charges generated on or in the electro-optic waveguide device; and,
electrodes on the charge bleed off layer for providing electrical signals to the optical waveguides through the buffer layer, the block layer, and the charge bleed off layer, wherein the block layer has a thickness in the range of 5 nm to 30 nm.

15. An electro-optic waveguide device as defined in claim 14, wherein the block layer has a higher electrical resistivity than the buffer layer.

16. An electro-optic waveguide device comprising:
an electro-optic substrate having one or more optical waveguides formed therein adjacent a surface thereof;
a buffer layer carried by the surface of the electro-optic substrate,
a block layer supported by the buffer layer and having a greater electrical resistance than the buffer layer, for lessening temporal or thermal drift of the electro-optic waveguide device or for suppressing or lessening an unwanted chemical reaction at or near the surface of the buffer layer;
a charge bleed off layer supported by the block layer, having an amount of electrical conductivity for bleeding off electrical charges generated on or in the electro-optic waveguide device, and
electrodes on the charge bleed off layer for providing electrical signals to the optical waveguides through the buffer layer, the block layer, and the charge bleed off layer, wherein the block layer is a stoichiometric or substantially stoichiometric silicon oxide or silicon nitride.

17. An electro-optic waveguide device comprising:
an electro-optic substrate having one or more optical waveguides formed therein adjacent a surface thereof;
a buffer layer carried by the surface of the electro-optic substrate,
a block layer supported by the buffer layer and having a greater electrical resistance than the buffer layer, for lessening temporal or thermal drift of the electro-optic waveguide device or for suppressing or lessening an unwanted chemical reaction at or near the surface of the buffer layer;
a charge bleed off layer supported by the block layer, having an amount of electrical conductivity for bleeding off electrical charges generated on or in the electro-optic waveguide device, and
electrodes on the charge bleed off layer for providing electrical signals to the optical waveguides through the buffer layer, the block layer, and the charge bleed off layer, wherein the buffer layer is made of a doped silicon oxide compound material comprising a majority part of silicon oxide and any dopants giving a relatively higher electrical conductivity than pure silicon oxide.

* * * * *